United States Patent [19]

Kelley et al.

[11] 4,382,132

[45] May 3, 1983

[54] HIGH PRESSURE POLYETHYLENE PROCESS

[75] Inventors: Joseph M. Kelley, Westfield; John J. Roderick, Wyckoff, both of N.J.

[73] Assignee: El Paso Polyolefins Company, Paramus, N.J.

[21] Appl. No.: 269,302

[22] Filed: Jun. 1, 1981

[51] Int. Cl.³ .............................. C08F 4/06; C08F 4/26
[52] U.S. Cl. ..................... 526/145; 526/135; 526/146; 526/147; 526/193; 526/222; 526/352; 585/527; 585/511; 585/531
[58] Field of Search ............... 585/511, 531, 527; 526/145, 146, 147

[56] References Cited

U.S. PATENT DOCUMENTS

| | | | |
|---|---|---|---|
| 2,998,416 | 8/1961 | Mendel | 526/145 |
| 3,331,827 | 8/1967 | McCall et al. | 526/145 |
| 3,622,648 | 11/1971 | Schloemer et al. | 585/511 |
| 3,686,159 | 8/1972 | Bauer et al. | 526/145 |
| 3,860,568 | 1/1975 | Chabert et al. | 526/146 |
| 3,985,718 | 10/1976 | Chabert et al. | 526/146 |
| 4,177,340 | 12/1979 | Böettcher et al. | 526/329 |

OTHER PUBLICATIONS

Ozawa et al., Chemical Abstracts, vol. 61, 1964, 9634b.
Chemical Abstracts, vol. 53, #5748f, Hecker et al., 1958.

Primary Examiner—Charles F. Warren
Assistant Examiner—Raymond Covington
Attorney, Agent, or Firm—Fred S. Valles; Margareta LeMaire

[57] ABSTRACT

A process for the high pressure polymerization of ethylene in a reactor in the presence of conventional free radical generating initiators, wherein the initiator material is admixed with certain additives in small concentrations to lower the polymerization initiation temperature.

15 Claims, No Drawings

HIGH PRESSURE POLYETHYLENE PROCESS

BACKGROUND OF THE INVENTION

The present invention pertains to a process for the polymerization of ethylene alone or with comonomers in the presence of conventional free radical generating initiators in a reactor at elevated pressures, wherein lower than conventional polymerization initiation temperatures are employed.

In the past, commercial processes for high pressure polymerization of ethylene have generally been conducted in the presence of oxygen or other high temperature initiators which decompose in the range from about 320° F. to about 640° F. Initiation of polymerization below 320° F. has been economically impractical because of the required large molar quantities of expensive low temperature initiators needed for such purpose. Another disadvantage in using low temperature initiators is that they decompose easily and therefore require special and expensive equipment for the safe storage and handling of these components.

U.S. Pat. No. 4,177,340 discloses that when using oxygen as the polymerization initiator, the start temperature can be lowered to an average value of less than 170° C. (338° F.), e.g., 165° C. (329° F.), by adding to the mixture of ethylene and oxygen from about 0.01 to about 0.5% by weight based on ethylene of certain alkenemonocarboxylic acid esters, e.g., n-butyl acrylate. However, the improvement obtained with this additive is not as great as one would desire, and it is, therefore, an object of this invention to provide a process for the polymerization of ethylene in the presence of relatively high temperature initiators at lower initiation temperatures than heretofore possible with the same initiator system.

Another object is to provide a novel high pressure process for the production of ethylene at increased conversion levels.

A further object is to provide a high pressure polyethylene process wherein capital investment as well as utility costs are reduced.

Further objects will become apparent from a reading of the specification and appended claims.

SUMMARY OF THE INVENTION

In accordance with this invention it was discovered that one can lower the polymerization initiation temperature quite substantially, e.g., from about 320° F. to about 280° F. and even as low as below 250° F. without changing the composition or concentration of the initiator mixture used in the reaction, provided that certain accelerator and coaccelerators are also present in the reaction zone in very small quantities. At least one organometallic accelerator needs to be included in the mixture, which accelerator is taken from the group consisting of metal complexes with beta-ketones and organometallic salts, wherein the metal can be cobalt, manganese, aluminum, iron and zirconium. In addition, there is required that at least one coaccelerator be present in the reaction mixture, which coaccelerator is selected from the group consisting of alkylphosphites, thioethers, and amines.

DETAILED DESCRIPTION

One preferred embodiment of the process of this invention can be described as one wherein ethylene at pressures of at least 20,000 psi and up to 100,000 psi is introduced into a pressure resistant, highly elongated tubular reactor at one end thereof, and wherein initiator material as well as the accelerator/coaccelerator components are introduced at a point or points immediately following the ethylene inlet vicinity. More than one initiator injection point can be employed at spaced apart distances which vary depending on various factors including the temperature peak resulting from the first initiator injection, length of the reactor tube, heat transfer, desired conversion and polymer properties, etc., as is well known in the art. These additional initiator injections may also be accompanied by additional introductions of accelerator/coaccelerator materials, if so desired. The preferred reactor pressure is maintained between about 30,000 psi and about 50,000 psi. The reaction temperatures generally range from about 250 F. or below to about 650 F. or higher.

The initiator material for the polymerization reaction includes the conventional free radical generating initiators, e.g., the peroxides and peresters listed below: hydrogen peroxide, 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxydicarbonate, acetyl peroxide, decanoyl peroxide, t-butyl peroxypivalate, t-butyl peroxyacetate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide, 2-5-dimethyl hexane-2, 5dihydroperoxide, t-butyl peroctoate, t-butyl peracetate, 1,1,3,3-tetramethyl butyl hydroperoxide, or mixtures thereof.

The concentration of initiator material used in the process of this invention varies with operating temperature and pressure. Thus, for polymerizations carried out at minimum pressures of about 20,000 psi, as high as about 75 parts per thousand parts of polyethylene produced (w/w) can be used while for pressures of about 40,000 psi to 45,000 psi and higher, that is to 60,000 psi, the concentration can be reduced suitably to as low as about 5 parts per thousand parts of polyethylene produced. Generally, the concentration is maintained between about 10 and about 35 parts per thousand parts of polyethylene.

The organometallic accelerator is selected from metal complexes with beta-ketones and organometallic salts. Specific examples of such accelerators are cobalt acetylacetonate, aluminum acetylacetonate, iron acetylacetonate, zirconium acetylacetonate, cobalt acetoacetate, aluminum acetoacetate, iron acetoacetate, zirconium acetoacetate, cobalt octoate, manganese octoate, vanadium octoate, aluminum octoate, iron octoate, zirconium octoate, cobalt naphthenate, manganese naphthenate, vanadium naphthenate, aluminum naphthenate, iron naphthenate, zirconium naphthenate, manganese perneodecanoate, vanadium perneodecanoate and many others. The cobalt containing accelerators are preferred, especially then cobalt naphthenate, cobalt octoate and cobalt acetyl acetonate.

The coaccelerator should be selected from amines, thioethers, or phosphites, such as dimethyl aniline, diethylaniline, dimethyl-p-toluidine, triethylene diamine, ethylene diamine tetraacetic acid, lauryl trimethyl ammonium chloride, distearyl thiodipropionate, dilauryl thiodipropionate, isooctyl thiodipropionate, ditridecyl thiodipropionate, isooctyl thioglycolate, n-dodecyl mercaptan, n-octyl mercaptan, n-lauryl mercaptan, decyl diphenyl phospite, triphenylphosphite and others. The preferred coaccelerators include dimethyl aniline, triethylene diamine, isooctyl thiodipropionate, triphenyl phosphite and N,N-dimethyl-p-toluidine.

The accelerator, coaccelerator and initiator(s) are advantageously injected into the reactor as a solution in a hydrocarbon solvent. Between about 0.1 and about 2.0 weight percent is used of each of the accelerator and coaccelerator relative to the weight of the initiator material in the solution, the preferred concentrations being between about 0.2 and 0.8 weight percent. The optimum concentration levels vary somewhat with the choice of initiators, accelerators and coaccelerators but can easily be determined for any given system with a few experiments. Suitable solvents are those of the hydrocarbon class, for example, paraffinic hydrocarbons such as pentane, hexane, heptane, cyclohexane and the like or aromatic hydrocarbons such as benzene, toluene, chloro-substituted aromatic hydrocarbons such as dichlorobenzene and the like. The combination of a paraffinic and aromatic solvent imparts improved solubility to solid initiators without freezing when used at elevated pressures. It is important from a safety standpoint that in preparing the solution the accelerator and coaccelerator first be dissolved or diluted in the solvent before the initiator material is added.

Immediately upon contact of preheated ethylene feed with the initiator/accelerator/coaccelerator mixture, the highly exothermic polymerization reaction is started and causes a rapid rise in the temperature along the length of a reaction zone until it reaches a peak when the initiator has been used up and polymerization discontinues. Cooling in one form or the other is required to control the reaction temperatures within safe and desired limits and to reduce the temperature of the reaction mixture to a second suitable initiation temperature after which it is contacted with additional initiator in the subsequent reaction zone. It is therefore the usual practice to employ water-cooled jacketed reactors and in addition to introduce relatively cool side streams of the ethylene feed along the length of the reactor in cooling zones located between the reaction zones. In addition to the beneficial cooling effect achieved by the ethylene side stream introductions, further yield advantages are obtained thereby.

Alternatively to the tubular reactors described above, other types of reactors, e.g., autoclaves, can also be used with advantage in the process of this invention.

In addition to the ethylene feed, a comonomer in amounts ranging from 0.1 to 20 mole percent of the ethylene may be employed. Illustrative examples of such comonomers include alpha-olefins such as propylene, butenes and pentenes, and other comonomers such as vinyl acetate and the like. A chain transfer agent can also be introduced into the polymerization system with the feed in amounts ranging from 0.01 to 5 mole percent of the ethylene feed. The chain transfer agent includes, for example, hexane or butane or a comonomer such as propylene which also functions as a chain transfer agent. The addition of a comonomer and/or a chain transfer agent permits one to vary the physical properties of the polyethylene products as is well-known in the art.

There are many advantages achieved by the present invention. Since the ethylene feed can be preheated to a considerably lower temperature prior to introduction into the reactor, the capital and utility costs associated with the feed preheater are greatly reduced. Perhaps the major advantage is that the conversion of ethylene to polyethylene is substantially increased, typically from 2 to 4 percent based on the ethylene feed. Also, substantial savings may be achieved by the invention, in that more stable, high temperature initiators may be used instead of costlier low temperature initiators, which also require special handling and storage facilities, which additionally add to the overall cost of the polymerization process. In addition, increased flexibility in selecting initiator systems for the polymerization will result in more control of the physical properties of the polymer product.

In order to provide a better understanding of the invention, the following illustrative examples are provided.

EXAMPLES 1–15

The continuous pilot plant polymerization runs of these examples were conducted in a water jacketed tubular reactor 406 feet long and having an inner diameter of $\frac{1}{2}$ inch. The reactor was equipped with thermocouples spaced along the length of the tube to indicate the temperature profile existing within the reactor throughout each of the runs. Compressed ethylene feed was preheated and introduced to the inlet of the reactor where it was contacted with metered quantities of an initiator solution discussed in further detail below. The inlet reactor pressure was maintained at about 37,000 psig. The reactor effluent was let down in pressure to about 4000 psig and introduced into a high pressure separation zone where unreacted monomer was separated from polymer, which after further pressure reduction to about 10 psig was introduced into a low pressure separation zone, where additional quantities of unreacted monomer was removed from the polymer product.

The initiator solution used in comparative Example 1 contained approximately 11 vol % initiators in 89 vol % hexane, wherein the initiators were a mixture of t-butylperoxypivalate, t-butylperoctoate, t-butylperbenzoate and di-t-butylperoxide in a 4/2/1/0.6 mol ratio. In the other examples the solutions also contained an accelerator and a coaccelerator in the proportions indicated in Table 1, which also shows other pertinent experimental data. Table 2 identifies the codes for the accelerators and coaccelerators used in Table 1.

As seen from the data, with the use of accelerator and coaccelerator in conjunction with a standard initiator mixture, operations at considerably lower polymerization initiation temperatures could be carried out without experiencing an undesired lowering of the peak temperature. The use of the accelerators and coaccelerators resulted in significant increases in conversion as well as a decrease in the initiator quantity needed to achieve acceptable conversions. A further important and unexpected advantage of the process of the invention is that significantly higher product densities may be obtained under certain process conditions.

Various additives, fillers, etc., such as antioxidants, slip and anti block agents, pigments fillers can be added to the polymer product as is well known in the art.

Resort may be had to many modifications of the specific embodiments of this disclosure falling within the spirit and scope of this invention as set forth in the appended claims.

TABLE 1

| EXAMPLE No. | 1 | 2 | 3 | 4 | 5 | 6 | 7 | 8 |
|---|---|---|---|---|---|---|---|---|
| Accel./Coaccel.: | | | | | | | | |
| Type | — | A-1/C-1 | A-1/C-1 | A-1/C-1 | A-1/C-1 | A-1/C-1 | A-1/C-2 | A-2/C-2 |
| Concentration Wt. % of Initiators | — | 0.4/0.2 | 0.6/0.3 | 0.4/0.4 | 0.4/0.4 | 0.4/0.4 | 0.7/0.5 | 0.7/0.5 |
| Ethylene feed - lbs./hr. | 1850 | 1850 | 1850 | 1850 | 1850 | 1850 | 1850 | 1850 |
| Initiator Material - lbs./1000 lbs. PE* | 28 | 15 | 14.8 | 22.3 | 18.4 | 16.2 | 22.2 | 20.7 |
| Reactor Inlet Temp. - °F. | 280 | 310 | 310 | 280 | 250 | 309 | 280 | 280 |
| Reactor Peak Temp. - °F. | 590 | 590 | 590 | 590 | 590 | 588 | 590 | 590 |
| Distance of Peak from Inlet - ft. | 37.5 | 37.5 | 25 | 37.5 | 50 | 37.5 | 50 | 37.5 |
| Conversion - % | 14.6 | 18.3 | 16.8 | 17.4 | 16.2 | 16.8 | 17.8 | 17.8 |
| Polymer Characteristics | | | | | | | | |
| Mw/Mn | 5.8 | 4.5 | 4.5 | 5.1 | 5.7 | 4.1 | 5.4 | 5.4 |
| Density gm/cc | .9259 | .9265 | .9265 | 0.9434 | 0.9431 | 0.9436 | .9276 | .9272 |
| Melt Index | 1.6 | 2.4 | 2.1 | 2.1 | 1.5 | 2.1 | 2.7 | 1.3 |

| EXAMPLE No. | 9 | 10 | 11 | 12 | 13 | 14 | 15 |
|---|---|---|---|---|---|---|---|
| Accel./Coaccel.: | | | | | | | |
| Type | A-2/C-2 | A-2/C-1 | A-2/C-1 | A-1/C-3 | A-1/C-3 | A-3/C-4 | A-3/C-4 |
| Concentration Wt. % of Initiators | 0.7/0.5 | 0.7/0.5 | 0.7/0.5 | 0.6/0.4 | 0.6/0.4 | 0.6/0.4 | 0.6/0.4 |
| Ethylene feed - lbs./hr. | 1850 | 1850 | 1850 | 1850 | 1850 | 1850 | 1850 |
| Initiator Material - lbs./1000 lbs. PE* | 20.65 | 21.7 | 24.2 | 17.4 | 23.1 | 16.5 | 16.9 |
| Reactor Inlet Temp. - °F. | 318 | 310 | 280 | 310 | 279 | 311 | 282 |
| Reactor Peak Temp. - °F. | 590 | 590 | 590 | 590 | 591 | 591 | 589 |
| Distance of Peak from Inlet - ft. | 37.5 | 37.5 | 37.5 | 50 | 50 | 50 | 62.5 |
| Conversion - % | 14.9 | 14.6 | 16.2 | 16.2 | 16.8 | 14.6 | 16.8 |
| Polymer Characteristics | | | | | | | |
| Mw/Mn | 5.4 | 5.6 | 5.6 | 5.0 | 4.6 | 4.8 | 5.2 |
| Density gm/cc | .9272 | .9262 | .9262 | .9210 | .9273 | .9257 | .9257 |
| Melt Index | 1.3 | 2.2 | 2.2 | 1.95 | 2.15 | 2.0 | 1.5 |

*Solvent free basis

TABLE 2

| CODE | IDENTIFICATION |
|---|---|
| A-1 | Cobalt Naphthenate |
| A-2 | Cobalt Acetylacetonate |
| A-3 | PEP-176 TM * |
| C-1 | Isooctyl thioglycolate |
| C-2 | Triphenylphosphite |
| C-3 | Triethylene diamine |
| C-4 | N,N—Dimethylparatoluidine |

*Tradename of substituted cobalt acetylacetonate supplied by Air Products and Chemicals, Inc., Allentown, Pa.

What is claimed is:

1. A process for the polymerization of ethylene which comprises
   continuously introducing ethylene to a reaction zone maintained at a pressure of at least 20,000 psi and contacting the ethylene with an initiator solution containing
   (a) at least one free radical generating polymerization initiator
   (b) from about 0.1 to about 2.0 weight percent based on the initiator weight of an accelerator selected from the group consisting of metal complexes with beta-ketones and organometallic salts and
   (c) from about 0.1 to about 2.0 weight percent based on the initiators weight of a coaccelerator selected from the group consisting of amines, distearyl thiodipropionate, dilauryl thiodipropionate, isooctyl thiodipropionate, ditridecyl thiodipropionate, isooctyl thioglycolate, n-dodecyl mercaptan, n-octyl mercaptan, n-lauryl mercaptan, decyl diphenyl phosphite and triphenylphosphite and recovering a solid ethylene polymer as a product of the process.

2. The process of claim 1 wherein the accelerator is a cobalt complex with beta-ketone.

3. A process of claim 1 wherein the accelerator is a metal naphthenate.

4. The process of claim 1 wherein the accelerator is a metal acetylacetonate.

5. The process of claim 1, wherein the accelerator is cobalt naphthenate.

6. The process of claim 1 wherein the accelerator is cobalt acetylacetonate.

7. The process of claim 1 wherein the coaccelerator is triphenylphosphite.

8. The process of claim 1 wherein the coaccelerator is an alkyl thiodiglycolate.

9. The process of claim 1 wherein the coaccelerator is isooctyl thiodiglycolate.

10. The process of claim 1 wherein the metal of the accelerator compound is cobalt.

11. The process of claim 1 wherein the metal of the accelerator compound is manganese.

12. The process of claim 1 wherein the initiator solution is prepared by dissolving the accelerator and coaccelerator in a hydrocarbon solvent prior to the addition of initiator material.

13. The process of claim 1 wherein the concentration of the accelerator is between about 0.2 and about 0.8 weight percent based on the initiator weight.

14. The process of claim 1 wherein the concentration of the coaccelerator is between about 0.2 and about 0.8 weight percent based on the initiator weight.

15. The process of claim 1 wherein the polymerization is conducted in a tubular reaction zone.

* * * * *